US008126928B2

United States Patent
Bossong-Iselborn

(10) Patent No.: US 8,126,928 B2
(45) Date of Patent: Feb. 28, 2012

(54) SYSTEMS AND METHODS FOR MERGING DATA INTO DOCUMENTS

(75) Inventor: Claudia U. Bossong-Iselborn, Sinsheim (DE)

(73) Assignee: SAP AG, Walldorf (DE)

( * ) Notice: Subject to any disclaimer, the term of this patent is extended or adjusted under 35 U.S.C. 154(b) by 382 days.

(21) Appl. No.: 11/823,795

(22) Filed: Jun. 27, 2007

(65) Prior Publication Data

US 2009/0006432 A1    Jan. 1, 2009

(51) Int. Cl.
*G06F 7/00* (2006.01)
*G06F 17/30* (2006.01)

(52) U.S. Cl. ........................................ 707/802; 707/803
(58) Field of Classification Search .................... 707/802
See application file for complete search history.

(56) References Cited

U.S. PATENT DOCUMENTS

| | | | |
|---|---|---|---|
| 6,732,111 B2 * | 5/2004 | Brodersen et al. ............ | 707/101 |
| 6,931,592 B1 * | 8/2005 | Ramaley et al. ............... | 715/209 |
| 7,401,291 B2 * | 7/2008 | Ramaley et al. ............... | 715/255 |
| 7,533,103 B2 * | 5/2009 | Brendle et al. ................ | 1/1 |
| 7,882,497 B2 * | 2/2011 | Nanivadekar et al. ........ | 717/138 |
| 2002/0103826 A1 * | 8/2002 | Kriho et al. ................... | 707/505 |
| 2004/0015476 A1 * | 1/2004 | Twaddle ........................ | 707/1 |
| 2004/0015842 A1 * | 1/2004 | Nanivadekar et al. ........ | 717/109 |
| 2004/0120013 A1 * | 6/2004 | Elkady et al. ................. | 358/1.18 |
| 2004/0135805 A1 * | 7/2004 | Gottsacker et al. ........... | 345/751 |
| 2004/0143464 A1 * | 7/2004 | Houle et al. ................... | 705/4 |
| 2004/0230886 A1 * | 11/2004 | Livshits ......................... | 715/500 |
| 2004/0252123 A1 * | 12/2004 | Estrada et al. ................. | 345/501 |
| 2005/0033695 A1 * | 2/2005 | Minowa .......................... | 705/45 |
| 2005/0039119 A1 * | 2/2005 | Parks et al. .................... | 715/515 |
| 2005/0102608 A1 * | 5/2005 | Batres ............................ | 715/505 |
| 2005/0120242 A1 * | 6/2005 | Mayer et al. .................. | 713/201 |
| 2005/0198393 A1 * | 9/2005 | Stutz et al. .................... | 709/246 |
| 2005/0216830 A1 * | 9/2005 | Turner et al. .................. | 715/513 |
| 2005/0278670 A1 * | 12/2005 | Brooks et al. ...................... | 716/5 |
| 2006/0010146 A1 * | 1/2006 | Nayak ............................ | 707/100 |
| 2006/0026221 A1 * | 2/2006 | Chen et al. .................... | 707/205 |
| 2006/0026300 A1 * | 2/2006 | Rose .............................. | 709/246 |
| 2006/0075323 A1 * | 4/2006 | Singh et al. ................... | 715/500 |
| 2006/0101115 A1 * | 5/2006 | Gleckman ..................... | 709/203 |
| 2006/0173884 A1 * | 8/2006 | Lin et al. ....................... | 707/101 |
| 2006/0173901 A1 * | 8/2006 | Lin et al. ....................... | 707/102 |
| 2006/0190355 A1 * | 8/2006 | Jammes et al. .................. | 705/27 |
| 2006/0212810 A1 * | 9/2006 | Segal et al. .................... | 715/530 |
| 2006/0253478 A1 * | 11/2006 | Graham et al. ............... | 707/100 |
| 2006/0265483 A1 * | 11/2006 | Wang et al. .................... | 709/223 |
| 2007/0061243 A1 * | 3/2007 | Ramer et al. ..................... | 705/37 |
| 2007/0118543 A1 * | 5/2007 | Yamamoto et al. ........... | 707/100 |
| 2008/0086369 A1 * | 4/2008 | Kiat et al. ......................... | 705/14 |
| 2008/0098291 A1 * | 4/2008 | Bradley et al. ................ | 715/223 |

* cited by examiner

*Primary Examiner* — Hung T Vy
*Assistant Examiner* — Tuan A Pham
(74) *Attorney, Agent, or Firm* — Finnegan, Henderson, Farabow, Garrett & Dunner LLP

(57) ABSTRACT

Systems and method in accordance with the presently claimed invention call embedded application to merge values into documents using applications on frontend devices. In some embodiments, the frontend application may be placed in an outplace view so that it will not be visible on the output viewed by the user. Further, in some embodiments, the front end device may trigger the saving of the documents that are created by the front end application.

13 Claims, 5 Drawing Sheets

Figure 3: Inplace view of resulted wordprocessing document.

SYSTEMS AND METHODS FOR MERGING DATA INTO DOCUMENTS

TECHNICAL FIELD

This disclosure relates to populating data fields of an electronic document and, more particularly, to populating data fields of an electronic document when using embedded applications.

BACKGROUND

Many organizations, both large and small, use mass mailings to communicate with current and potential customers, clients, and/or members. Organizations may use a mail merge process to create the documents for these mass mailings. These documents may be physical documents, such as letters or flyers, or they may be electronic documents that are emailed to recipients.

The documents that are communicated as part of the mass mailing may be personalized. This personalization may be accomplished using a mail merge feature implemented in computer software. The mail merge software may access information from a structured data source, like a database, and place the accessed information into the appropriate position of a template to personalize each document in a mass mailing. A business, for example, may use the mail merge feature in the word processing program to generate customer invoices. In this example, the business may maintain a list of customer names, the corresponding mailing address for each customer, and the customer's existing balance. A mail merge program may create each customer invoice by placing the customer's name, mailing address, and existing account balance into the appropriate locations of an invoice template to personalize each customer's invoice.

A mail merge process may be implemented using software that is run on the user's computer. For example, a mail merge process may be included as a feature in a word processing program, such as MICROSOFT WORD. The mail merge software may create and keep open multiple documents during the mail merge process. For example, when the mail merge software is used to personalize customer invoices, the mail merge software may open a new document on the user's computer for each personalized invoice that is created. Thus, a mail merge program that creates 10 personalized invoices may create and keep open 10 documents during the mail merge process.

A user may access the mail merge process using an embedded application. Issues may arise, however, when using embedded applications in the prior art to allow applications on other devices to access programs on the user's computer. For example, some applications, including embedded applications, may not allow a user to view multiple windows. Instead, embedded applications may restrict the user to viewing one window at a time, complicating the use of programs that cause multiple documents to be opened. Further, distributing data from a database to a an application on the user's computer may cause the application to quickly open and then minimize multiple documents on the output of the user's computer. The application programming interface in the application may be unable to suppress these "blinking" documents from appearing on the user computer's output when the application defaults to opening documents as visible. Finally, embedded applications may not allow the user's device to trigger the saving of a document. As such, for at least these reasons, there is a need to improve the ability of embedded systems to allow access to programs on applications on the user's computer.

SUMMARY

In accordance with the invention, a method for merging data into documents at a frontend device by using an embedded application to access a software application is disclosed. In some embodiments, the method may include controlling the embedded application to make the software application not visible through a user interface while the software application is running; performing a data merge process using the software application, wherein the software application is accessed by the embedded application; identifying newly created documents since performing the data merge process; and storing the identified documents in at least one of a backend device, and a computing device separate from the frontend and backend devices.

In some embodiments of the disclosed method, identifying newly created document may include generating a first list identifying all opened documents on the frontend device before the data merge process, and generating a second list identifying all opened documents on the front-end device after performing the data merge process A system for merging data into documents by using an embedded application to access a software application in accordance with the invention is also disclosed. The system may include a backend device for controlling the embedded application, wherein the embedded application makes the software application not visible through a user interface while the software application is running, and a frontend device for performing a data merge process using the software application accessed by the embedded application and for identifying newly created documents since performing the data merge process. In some embodiments, the identified documents may be stored on at least one of a backend device, and a computing device separate from the frontend and backend devices.

A computer program for using an embedded application to access a software application for merging data into documents at a frontend device in accordance with the present invention is also disclosed. The program may include computer code for controlling the embedded application to make the software application not visible through a user interface while the software application is running, computer code for calling the software application to perform a data merge process, wherein the software application is accessed by the embedded application, computer code for identifying newly created documents since performing the data merge process, and computer code for causing the identified documents to be stored in at least one of a backend device, and a computing device separate from the frontend and backend devices.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as described. Further features and/or variations may be provided in addition to those set forth herein. For example, the present invention may be directed to various combinations and sub-combinations of the disclosed features and/or combinations and sub-combinations of several further features disclosed below in the detailed description.

BRIEF DESCRIPTION OF THE DRAWINGS

The accompanying drawings, which are incorporated in and constitute a part of this specification, show certain aspects of the present invention and, together with the description, help explain some of the principles associated with the invention. In the drawings.

DETAILED DESCRIPTION

Reference will now be made in detail to the invention, examples of which are illustrated in the accompanying drawings. The implementations set forth in the following description do not represent all implementations consistent with the claimed invention. Instead, they are merely some examples consistent with certain aspects related to the invention. Wherever possible, the same reference numbers will be used throughout the drawings to refer to the same or like parts.

Figure 1:
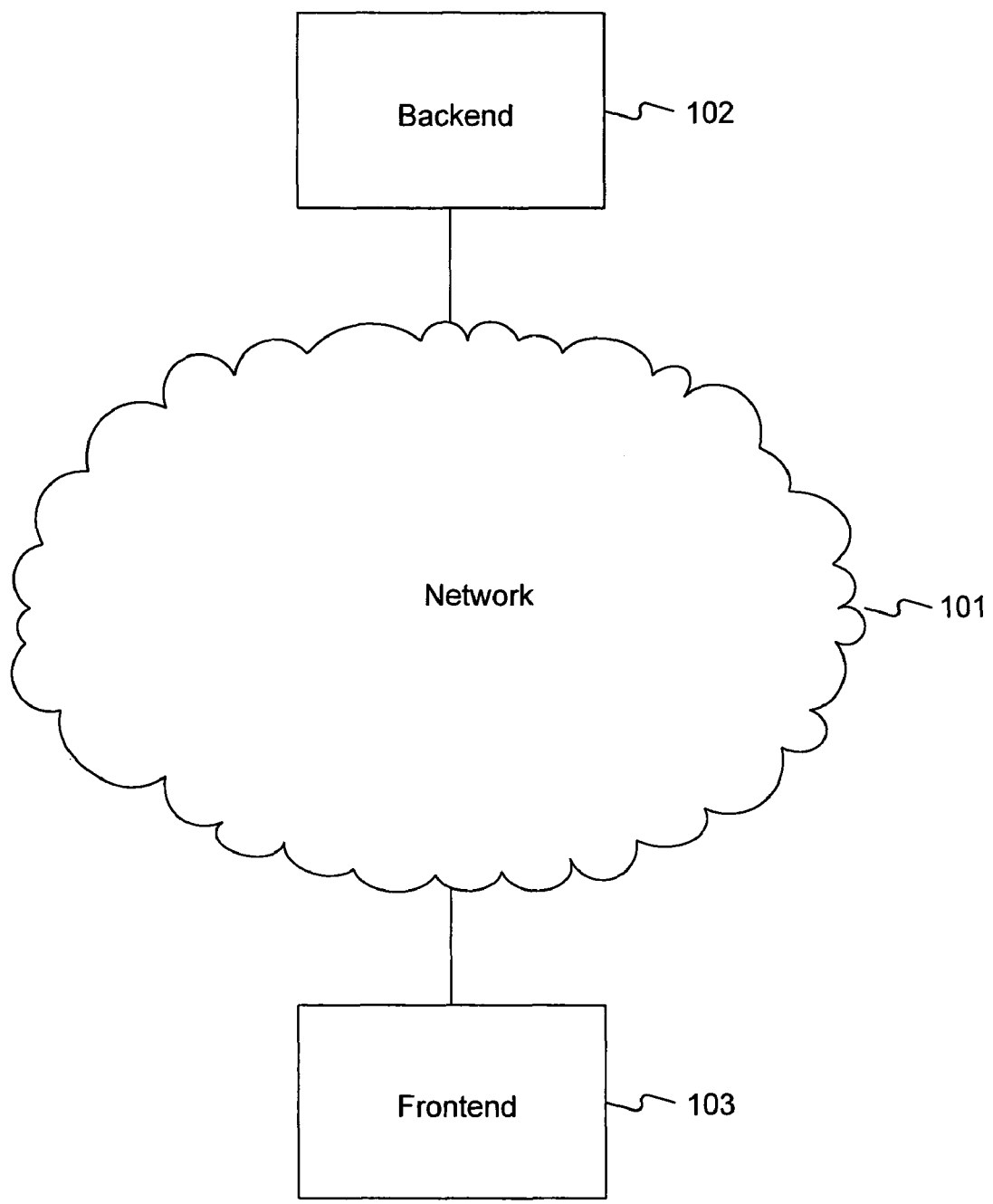
FIG. 1 shows a block diagram of an exemplary system capable of implementing a data merge process consistent with the present invention.

FIG. 1 shows a block diagram of an exemplary system capable of implementing data merge processes consistent with the present invention. As shown in FIG. 1, exemplary system 100 may include a network 101 coupled to backend 102 and frontend 103. Network 101 may be any appropriate type of data communication network, such as the Internet. The Internet may refer to any publicly accessible network or networks interconnected via communication protocols, such as transmission control protocol/internet protocol (TCP/IP). Network 101 may also be a private network, which may be any appropriate type of data communication network, such as a local area network or other private computer network. In some embodiments, access to a private network may be restricted using a firewall (not pictured).

Backend 102 may be implemented using a server or any other type of computing device capable of storing data and implementing software programs. Backend 102 may be capable of operating ABAP applications. Backend 102 may also be capable of operating Java applications, including applications written in J2EE. A backend program may be any program or software capable of being implemented by a server, a database, or any other type of computing device. The backend programs may include, for example, a human resources recruitment process and an invoicing process.

Frontend 103 may be implemented using a computer workstation, desktop, computer, laptop computer, or any other computing device capable of accessing a computer application. In some embodiments, frontend 103 may access a computer application located on another computing device, such as backend 102, using network 101. The programs running on frontend 103 may be referred to as front-end programs.

The computing devices used to implement backend 102 and frontend 103 may include one or more connections that can be used to communicate with other devices, such as each other, over network 101. A connection included on the devices used to implement backend 101 and frontend 102 may connect to any communication channel capable of allowing the transmission of data between devices. The channel may be a wired or wireless connection using conventional communication protocols and/or data port interfaces. In one embodiment, for example, the computing devices may be provided with conventional data ports, such as USB, FIREWIRE and/or serial or parallel ports for transmission of data through the appropriate communication connection. The communication connection may be any combination consistent with embodiments of the present invention that allows communication between backend 101 and frontend 102.

Figure 2:
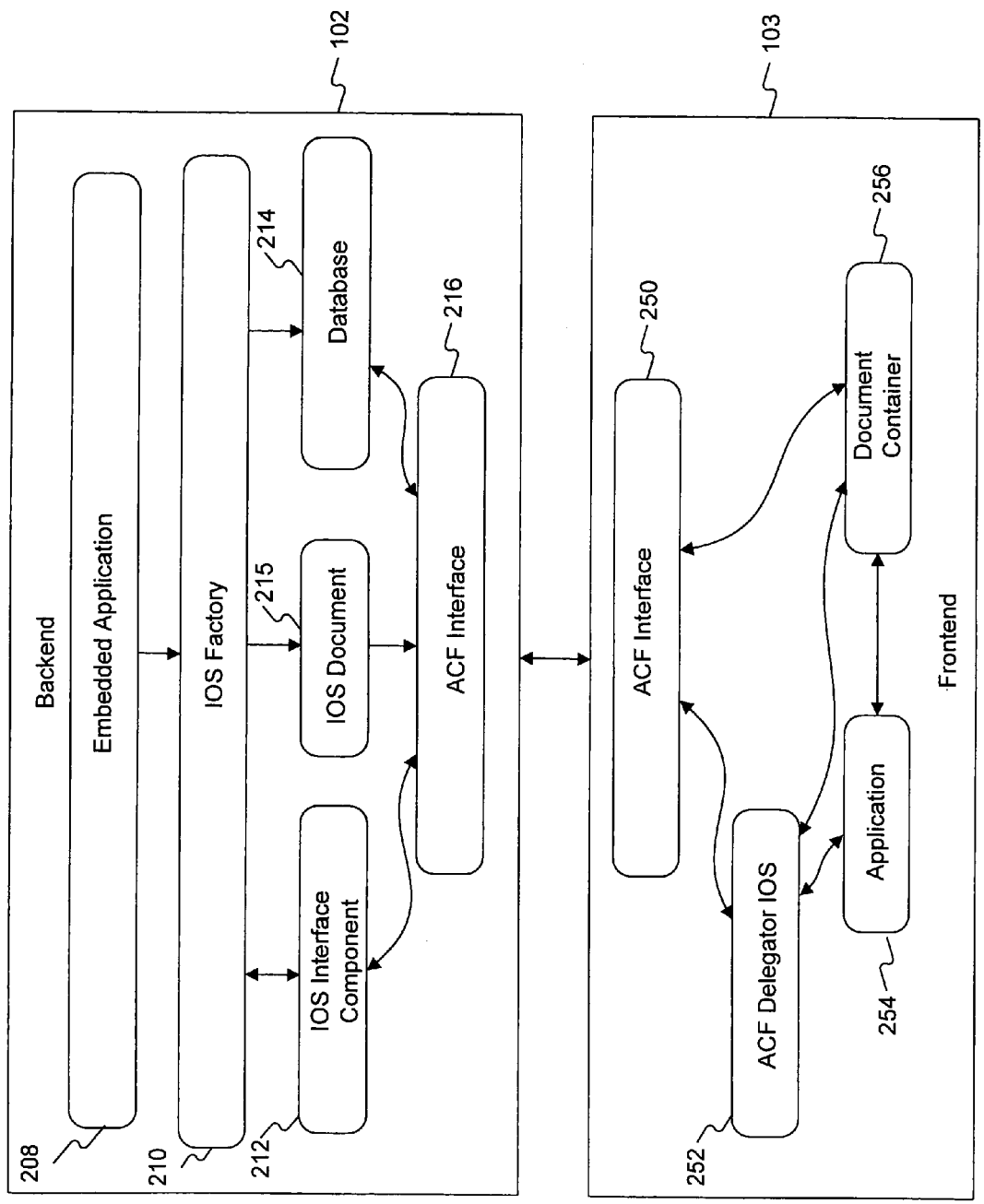
FIG. 2 shows exemplary embodiments of a backend device and a frontend device consistent with the present invention.

FIG. 2 shows exemplary embodiments of a backend device and a frontend device. Backend 102 may include embedded application 208, Integrated Office Suites ("IOS") Factory 210, IOS interface component 212, database 214, IOS Document 215, and Active Component Framework ("ACF") interface 216.

Embedded application 208 may be any type of software application devoted to performing a specific task or set of tasks. Although FIG. 2 shows embedded application located on backend 102, embedded application 208 may be run on any computing device that can communicate with frontend 103. In some embodiments, backend 102 may include a computing device that is devoted to running only embedded application 208. Further, backend 102 may include computing hardware that is devoted specifically to running embedded application 208. The HR Recruitment application from SAP AG of Walldorf, Germany, may be an example of an embedded application. The HR Recruitment application is devoted to performing only those tasks related to the recruiting process, such as, for example, searching resumes, advertising vacancies, and handling correspondence with applicants. The HR Recruitment application may be located on backend 102.

Embedded application 208 may be accessed from frontend 103 using a graphical user interface that allows frontend 103 to communicate with the other computing devices on the network. In some embodiments, the graphical user interface may be implemented using a web page interface over a network connection. The web page interface may be, for example, a web browser. For example, the graphical user interface may include the SAP GUI, which allows users to access SAP programs stored on backend 102. Frontend 103 may also be coupled to an output device (not shown), such as a computer monitor.

IOS Factory 210 may provide an interface to allow embedded application 208 to control one or more applications on frontend 103. IOS Factory 210 may be implemented using software on backend 102. In some embodiments, for example, IOS Factory 210 may be implemented using WEB DYNPRO from SAP AG of Walldorf, Germany. Although FIG. 2 shows IOS Factory 210 in a single component on backend 102, the functions of IOS Factory 210 may be implemented on a plurality of computing devices. In some embodiments, some of the functions of IOS Factory 210 may be implemented on frontend 103.

In some embodiments in which embedded application 208 is accessed using a graphical user interface, IOS Factory 210 may modify the user interface to indicate to the user that additional functions may be accessed on front-end programs. The user interface for embedded application 208 may be programmed using WEB DYNPRO. When IOS Factory 210 allows embedded application 208 to access functions on frontend programs, IOS Factory 210 may cause the user interface provided by WEB DYNPRO to be modified to indicate to the user that these functions are available. For example, if IOS Factory 210 allows embedded application 208 to access a mail merge function on frontend 103, embedded application 208 may cause a mail merge "button" to appear on the user interface to indicate to the user that the mail merge function is available.

Backend 102 may include one or more IOS interface components 212. In some embodiments, IOS Factory 210 may call one or more IOS interface components 212 to manipulate applications on frontend 103. An IOS interface component 212 may use a set of controls for communicating with and manipulating a specific application on frontend 210. In some embodiments, IOS interface component 212 may use ActiveX controls to manipulate frontend applications. For example, in the mail merge process described above, IOS Factory 210 may call IOS interface component 212 that can use ActiveX controls to manipulate the operation of a word processing application on frontend 103. In some embodiments, IOS interface component 212 may provide access to other applications on front end 103, such as spreadsheet applications.

By accessing one or more IOS interface components 212 to control programs on frontend 103, IOS Factory 210 may increase the level of abstraction for the user by hiding the different frontend applications called by IOS Factory 210. For example, in a mail merge process used to create a set of user invoices, IOS Factory 210 may call an IOS interface component 212 for accessing the mail merge function on a word processing program on frontend 103. The user, however, does not have to know that the word processing program on frontend 103 is being accessed for this function and instead, may only be aware of the resulting mail merge documents. Accordingly, a user may only be aware of the functions that IOS Factory 210 can implement and not of the applications on frontend 103 called to implement these functions.

Referring again to the exemplary embodiment shown in FIG. 2, backend 102 may contain one or more IOS Documents 214. IOS Document 214 may be any electronic document stored on backend 102. IOS Document 214 may contain different fields for holding variables. IOS interface component 212 may define the fields in IOS Document 214. For example, IOS interface component 212 may define the variable type that may be entered into each field in IOS Document 214. In some embodiments, IOS document 214 may be a template for use with software applications, such as those stored on backend 102. For example, OS Document 214 may be a template for a letter or an invoice stored as a word processing document, or a budget or inventory stored as a spreadsheet.

When an IOS interface component 212 manipulates a program in frontend 103, it may cause IOS Document 214 to be transmitted to frontend 103 for use in the manipulated frontend program. In some embodiments, IOS Factory 210 may cause IOS Document to be transmitted to frontend 103. For example, when creating a set of personalized customer invoices, IOS document 214 may be a template for the invoices to be sent to customers. IOS Factory 210 may cause the invoice template to be transmitted to frontend 103 for use by the word processing program in a mail merge process.

Backend 102 may contain one or more databases 215. Database 215 may include information, software, and/or data that backend 102 may access. Data in database 215 may be entered manually. Alternatively, or in addition, data in database 215 may be captured automatically from other electronic sources. Database 215 may be a sub-component of backend 102 and/or a separate component from backend 102. In some embodiments, database 215 and backend 102 may be coupled to a network (not shown) that allows the two devices to communicate with each other. Data from database 215 may be used in mail merges to personalize documents. The data from database 215 may be merged into the fields of a template to create the personalized documents.

ACF interface 216 may include a physical connection for coupling backend 102 to network 101 (not shown in FIG. 2). ACF interface 216 may include hardware and/or software for transmitting data and/or files between backend 102 and frontend 103. In some embodiments, ACF interface 216 may accept ActiveX controls from IOS interface component 212 and transmit those controls to frontend 103. For example, IOS interface component 212 may contain a set of ActiveX controls, IOS document 214 may be an invoice template, and database 215 may contain customer balance and address information. ACF interface 216 may be used to pass the controls from IOS interface component 212, the invoice template in IOS document 215, and the information from database 214 to a mail merge function on frontend 103 to create a set of personalized invoices. Backend 102 may obtain the set of personalized invoices from application 254 using IOS Document Container 256 on frontend 103. ACF interface 216 may be used to receive the set of personalized invoices for storing on backend 102. ACF Interface 216 may use a protocol to communicate with frontend 103. For example, when using the NETWEAVER platform from SAP AG of Walldorf, Germany, the protocol used by ACF Interface 216 to communicate with frontend 103 may be an integrated part of the NETWEAVER platform.

Referring again to FIG. 2, frontend 103 may include ACF interface 250, ACF Delegator IOS 252, application 254, and Document Container 256. In one example, application 254 is a word processor application. ACF interface 250 may include software for transmitting data and/or files between frontend 103 and backend 102. In some embodiments, ACF interface 250 may receive data and/or files from backend 102 transmitted over network 101. In the example above in which a set of personalized invoices are created, ACF interface 250 may be used to receive the ActiveX controls, the invoice template, and the customer information transmitted from components on backend 102 using ACF interface 216. ACF Interface 250 may use a protocol to communicate with backend 102. For example, when using the NETWEAVER platform from SAP AG of Walldorf, Germany, the protocol used by ACF Interface 250 to communicate with backend 102 may be an integrated part of the NETWEAVER platform.

Frontend 103 may include ACF Delegator IOS 252. In accordance with some embodiments of the invention, ACF Delegator IOS 252 may receive the data and/or files transmitted from backend 102 and perform one or more actions based upon the received data and/or files. In some embodiments, ACF Delegator IOS 252 may identify each document currently opened on frontend 103 and make a first list of the identified documents. In some embodiments, ACF Delegator IOS 252 may only identify a subset of documents currently opened on frontend 103 and make a first list of this subset. For example, when backend 102 has transmitted a set of controls to access the mail merge function of a word processing program on frontend 103, ACF Delegator IOS 252 may identify each document of the word processing program opened on frontend 103 and make a first list that contains only these documents.

In some embodiments, ACF Delegator IOS 252 may create an environment for executing the controls received from backend 102. The controls executed by ACF Delegator IOS 252 may allow it to access functions and programs on frontend 103. In one embodiment of the present invention, ACF Delegator IOS 252 may create an ActiveX environment for hosting IOS document 215 and executing the ActiveX controls received from IOS interface component 212. ACF Delegator IOS 252 may be able to access one or more programs on frontend 103 implemented by application 254, including word processing and spread sheet programs. The type of program accessed may depend on the controls received from backend 102.

In the example in which backend 102 transmits controls to access the mail merge function on frontend 103, ACF Delegator IOS 252 may create an ActiveX environment. The ActiveX environment created by ACF Delegator IOS 252 may be used to host the invoice template received from backend 102. As part of the presently described embodiment, ACF Delegator IOS 252 may also use the ActiveX environment to execute the ActiveX controls received from IOS interface component 212. The ActiveX controls may instruct a word processor application 254 to merge customer data from database 215 into the invoice template from backend 102 to create a set of personalized customer invoices using the mail merge function contained in word processor 254. As part of the ActiveX controls, ACF Delegator IOS 252 may access word processor 254 in the background of frontend 103. Accordingly, when word processor 254 is running in the background, each of the documents created by word processor 254 as part of the mail merge process may not be visible to the user on the output of frontend 103. Word processor 254 may be referred to as running in an "outplace view" when it is not visible on the output of frontend 103.

After the function on frontend 103 is complete, ACF Delegator IOS 252 may identify each document currently opened on frontend 103 and make a second list of the identified documents. In some embodiments, ACF Delegator IOS 252 may only identify a subset of documents currently opened on frontend 103 and make a second list of this subset. For example, when backend 102 has transmitted a set of controls to access the mail merge function of a word processing application 254 on frontend 103, ACF Delegator IOS 252 may identify each document of the word processing application opened on frontend 103 and make a second list that contains only these documents. By comparing the documents on this second list with the documents on the first list, ACF Delegator IOS 252 may identify each of the documents created during the called function. For example, when the mail merge function of word processor 254 is used to create a set of personalized invoices, word processor 254 may create and keep open each of the personalized invoices created during this process. In this example, only the second list will contain each of the newly created personalized invoices. Accordingly, ACF Delegator IOS 252 may compare the first and second lists to identify the documents created by the mail merge function.

ACF Delegator IOS 252 may copy each newly created document into frontend 103. Each of the newly created documents may contain an interface that allows them to be controlled by ACF Delegator IOS 252. For example, when creating a set of personalized invoices, each of the newly created personalized invoices may contain an IOleObject interface (or other interface through which an embedded object may provide functionality to, for example, Container 256) that allows each invoice to be controlled by the ActiveX controls in ACF Delegator IOS 252. Using the ActiveX controls, ACF Delegator IOS 252 may use the IOleObject interface to save each of the newly created documents. In some embodiments, ACF Delegator IOS 252 may save each newly created document into Document Container 256. Accordingly, saving each newly created document may be triggered from the front end device.

After frontend 103 saves the newly created document, the function called on frontend 103 may be changed to be visible from the browser used to access backend 102. In some embodiments, IOS Factory 210 may change the function in frontend 103 to be visible. When an application, such as application 254, on frontend 103 is visible through the browser used to access backend 102, the application may be said to be "inplace."

After ACF Delegator IOS 252 has saved each newly created document to frontend 103, it may cause the newly created documents to be transmitted to backend 102 using ACF interface 250. When backend 102 receives the newly created documents on ACF interface 216, the documents may be saved by backend 102. Backend 102 may save the documents so that the original format of the documents is preserved. Application 254 may later be used to open documents that have been saved in the original format.

The components shown in FIG. 2 and described above are exemplary. Other components may be used to implement the disclosed systems and methods consistent with the invention. For example, the components and functions described as part of backend 102 may be implemented across multiple computing devices. In some embodiments, the functions associated with IOS Factory 210 and/or ACF Delegator IOS may be implemented by more than one computing device or by more than one module on a computing device. For instance, the function by IOS Factory 210 of providing an interface for the user to access the embedded application may be implemented by one module while the function of controlling the IOS interface component 212 may be implemented using a second module. Similarly, the functions and components on fronted 103 may also be implemented using multiple computing devices. For example, ACF Delegator IOS may be implemented using more than one module in frontend 103. Finally, while the exemplary embodiment of FIG. 2 relates to an implementation using IOS and ACF type components, systems consistent with the invention may be implemented by arrangements using other types of components. For example, the general features of transmitting IOS Document 214 from backend 102 to application 254 on frontend 103, saving the newly created set of documents to Document Container 256, and transmitting the newly created set of documents to backend 102 for saving may be available on other applications, such as MICROSOFT VISIO or POWERPOINT.

Figure 3:
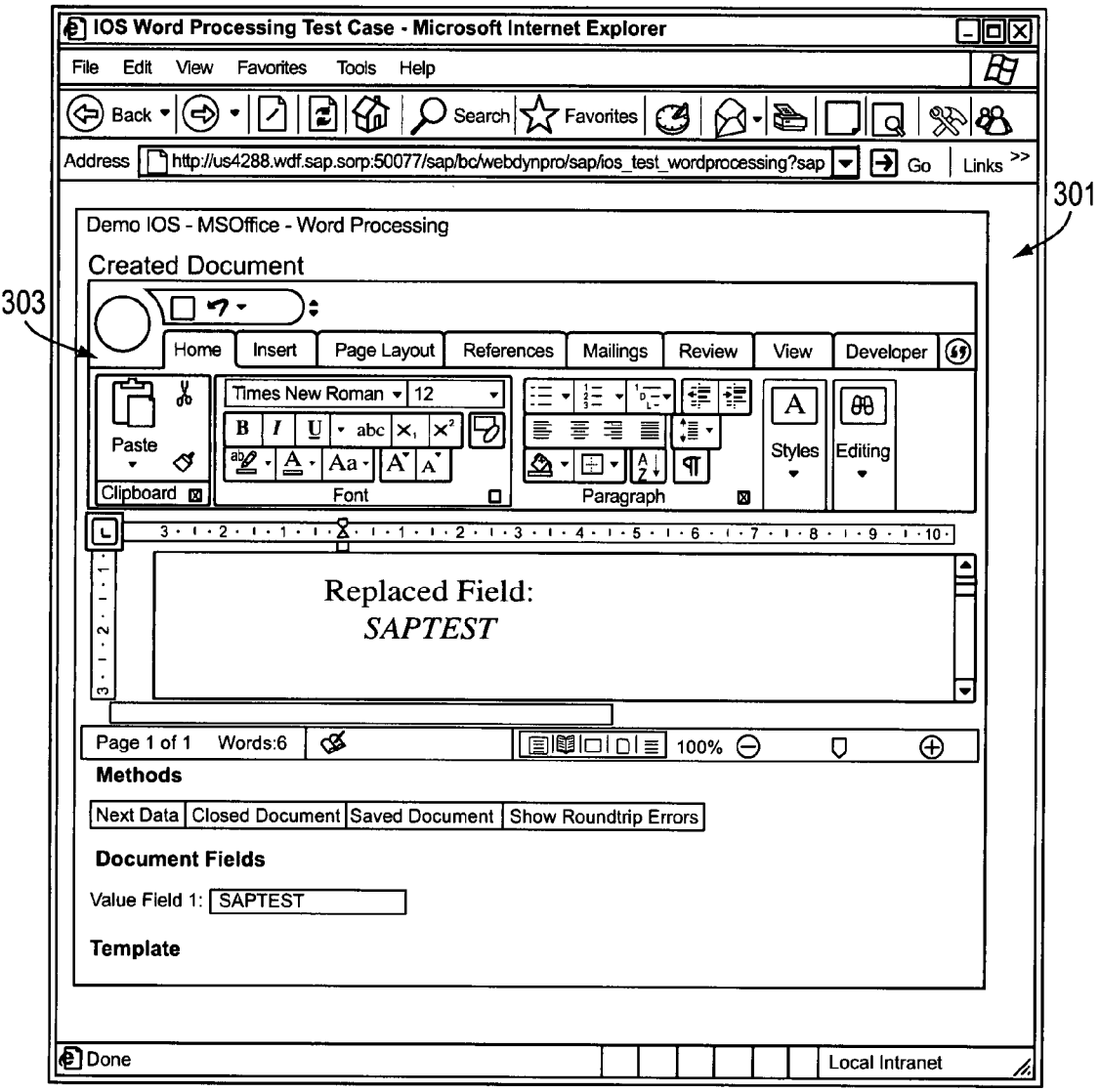
FIG. 3 shows an example of an inplace view of a program accessed by the backend device.

FIG. 3 shows an example of an inplace view of a program accessed by the backend device. In the exemplary embodiment shown in FIG. 3, a user may access backend 102 using browser 301. Backend 102 may then access word processor 254 on frontend 103. Word processing display 303 of word processor 254 may be visible through browser 301 when wordprocessor is in an inplace view. When word processor 254 is running the mail merge function, however, word processor 254 may be in an outplace view so that none of the documents created during the mail merge process is visible on the output of frontend 103. After the mail merge process is complete, backend 102 may change word processor 254 to an inplace view, so that word processing display 303 of word processor 254 may be visible on browser display 301. In some embodiments, the program to be accessed by backend 102 may initially be set for an inplace view. Before accessing the program, backend 102 may set this program to have an outplace view until backend 102 has finished accessing the program. When backend 102 is finished accessing the frontend program, it may change the program to have an inplace view.

Figure 4:
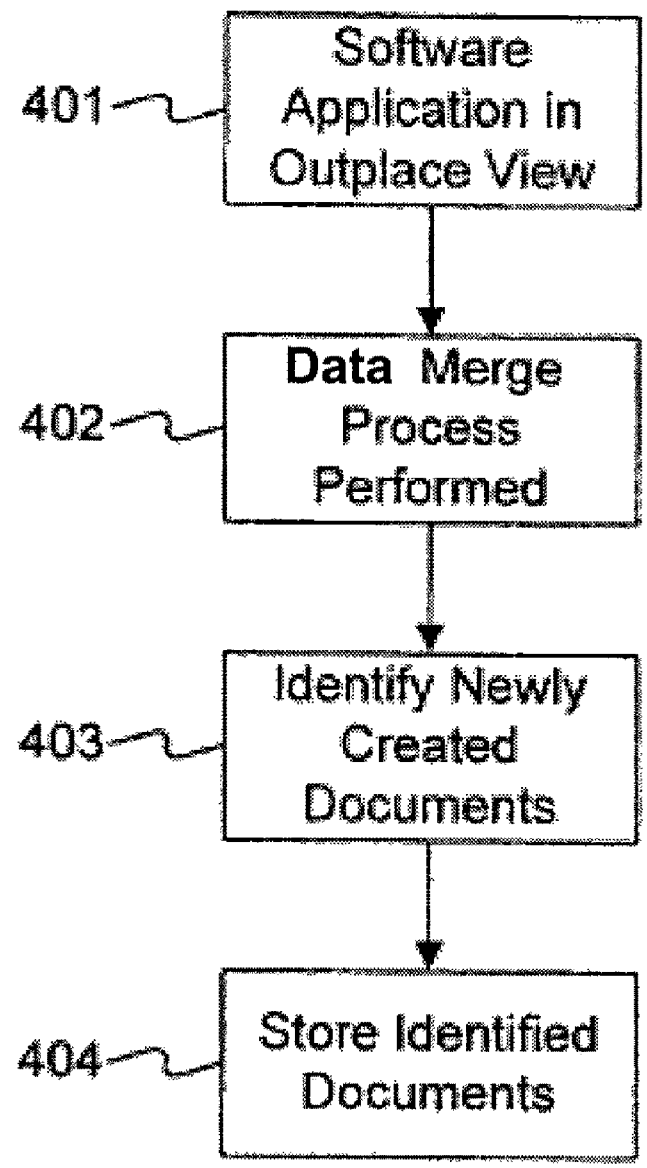
FIG. 4 illustrates an exemplary data merge process consistent with the present invention.

FIG. 4 shows an exemplary data merge process consistent with the present invention. In stage 401 of the exemplary process, embedded application 208 may be controlled to make a software application, such as application 254, not visible through a user interface while the software application is running. Thus, if software application 254 is in an inplace view, it may be changed to an outplace view. If software application 254 is already in an outplace view, then it may be maintained in the outplace view. The command for placing application 254 into an outplace view may come from embedded application 208 on backend 102. Embedded application 208 may include, for example, the HR Recruitment application from SAP AG. Alternatively or additionally, this command may come from an application running on frontend 103. For example, the frontend component used for implementing browser 301 may be used to place the software application into an outplace view.

In stage 402, a data merge process may be performed. The data merge process may be performed using, for example, software application 254. In some embodiments, as shown in FIG. 2, software application 254 used to perform the data merge process may be run on frontend 103. Also, the data used in the data merge process of stage 402 may be transmitted to software application 254 from backend 102, from a database 215, or frontend 103. In some embodiments, database 215 may be separate from backend 102 and from frontend 103.

In stage 403, any documents that have been newly created since performing the mail merge process may be identified. This identification may be performed by frontend 103. For example, frontend 103 may have a processor (not shown) that can be used to identify the newly created documents.

In stage 404, the identified documents may be stored in one or more of frontend 103, backend 102, and database 215. The identified documents may be transmitted over network 101 when being stored in backend 102, such as in database 215. Further, ACF interface 250 on frontend 103 may be used to transmit the identified documents on network 101. AFC interface 216 may be used to receive the identified documents that have been transmitted over network 101.

Figure 5:
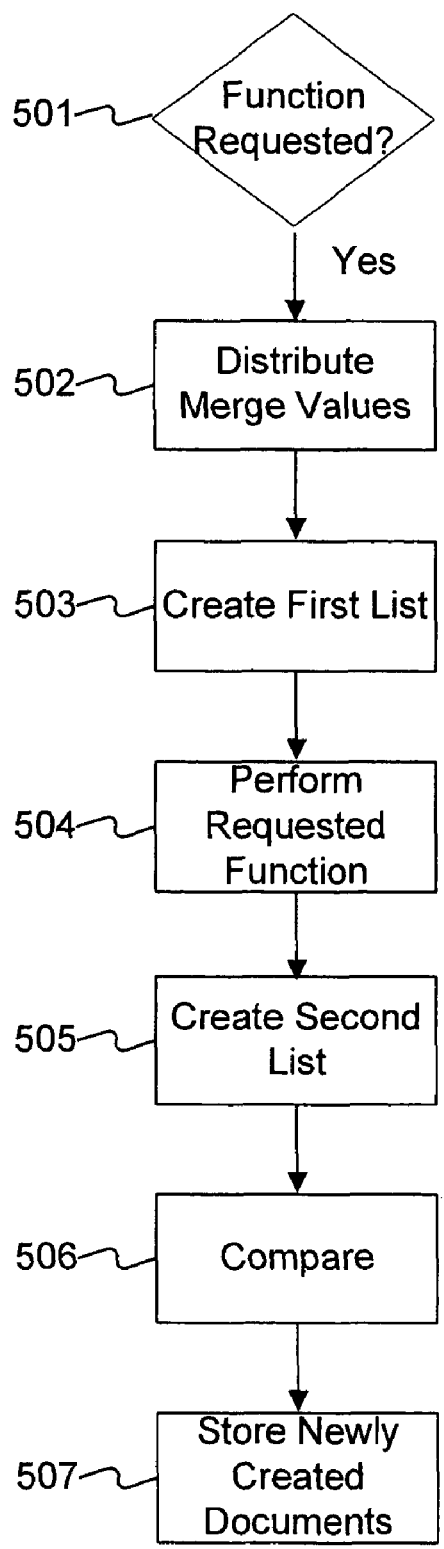
FIG. 5 illustrates additional aspects of an exemplary data merge process consistent with the present invention.

FIG. 5 illustrates additional aspects of an exemplary data merge process consistent with the present invention. The data merge process of FIG. 5 may correspond, in one implementation, to a more detailed illustration of the exemplary process of FIG. 4. As stage 501, systems consistent with the invention may determine whether a function, such as a mail merge function, on frontend 103 has been requested. The user may cause the frontend application to be called, by requesting, for example, that an embedded HR Recruitment application on backend 102 access a mail merge function on frontend 103. This determination may be made by a processor on backend 102.

In stage 502, the merge values are distributed to frontend 103. In some embodiments, merge values may be obtained by a process on backend 102. Merge values may be stored on a database, such as database 215, that forms a part of backend 102. The database that stores merge values may also be separate from backend 102. The process on backend 102 that obtains the merge values may be written using ABAP or Java. For example, a user may wish to make a set of customer invoices. The merge values may include each customer's name, a customer's address, and a customer's account balance. The merge values may be distributed using, for example, an ACF. As described above with respect to FIG. 2, the ACF may be implemented on backend 102 or on frontend 103. The ACF may also be implemented in part on backend 102 and in part on frontend 103. In some embodiments, the ACF may be implemented using ActiveX controls. The ActiveX controls may be on either or both of backend 102 and frontend 103. When the disclosed invention is used to create a set of personalized invoices, the merge values described above may be distributed from backend 102 to frontend 103 using the active component framework. A template, as described above, may also be transmitted to frontend 103.

In stage 503, a first list of opened documents on frontend 103 may be generated. The first list of opened documents may contain all documents opened on frontend 103. The first list of opened documents may contain a subset of opened documents on frontend 103. In the example in which a mail merge function of a word processor is requested to create personalized invoices, the first list of opened documents may only contain documents opened by the word processor, such as word processor 254.

In stage 504, an application accessed on frontend 103 may perform the requested function. In some embodiments, the template used by the frontend application may be stored on frontend 103 or on backend 102. In some embodiments, the frontend application may be in an outplace view in which the frontend application may not be visible on the user interface of the user's device when the application is being accessed by an embedded application. In some embodiments, an application in an outplace view may not be visible at any time. In some embodiments, an application in an outplace view may not be visible only when the application is being accessed by an embedded application. In the invoice example, the called mail merge function may create the set of personalized invoices. In this example, each of the documents created by the mail merge function will not be visible on the user's user interface.

In stage 505, a second list of opened documents on frontend 103 may be generated. The second list of opened documents may contain all documents opened on frontend 103. The second list of opened documents may contain a subset of opened documents on frontend 103. In the example in which a mail merge function of a word processor is accessed to create personalized invoices, the second list of opened documents may only contain documents opened by the word processor to perform the requested function.

In stage 506, the newly created documents during the performance of the requested function are identified. In some embodiments, the documents on the second list are compared to the documents on the first list to identify the newly created documents. The difference between the documents on the first list and the second list may indicate the documents created by the frontend application.

In stage 507, each of the newly created documents may be saved to frontend 103. In some embodiments, each newly created document may include an interface that allows it to be controlled by ACF Delegator IOS 252. For example, when creating a set of personalized invoices, each of the newly created personalized invoices may contain an IOleObject interface that allows each invoice to be controlled by the ActiveX controls in ACF Delegator IOS 252. Using the ActiveX controls, ACF Delegator IOS 252 may use the IOleObject interface to save each of the newly created documents. In some embodiments, ACF Delegator IOS 252 may save each newly created document into a document container. Accordingly, saving each newly created document may be triggered from the front end device.

Further in stage 507, the newly created documents may be transmitted to backend 102 where each may be saved. For example, database 215 may store each newly created document. Finally, after backend 102 saves the newly created document, the function called on frontend 103 may be changed to be visible from the browser used to access backend 102. In some embodiments, IOS Factory 210 may change the function in frontend 103 to be visible. In some embodiments, embedded application 208 may change the function in frontend 103 to be visible. When an application on frontend 103 is visible through the browser used to access backend 102, the application may be said to be "inplace." In some embodiments, the application that is accessed on frontend 103 may be inplace before the process begins. When the application is inplace, it may be changed to be outplace before stage 501. The remaining stages may then be performed as described above.

As described above, systems and methods consistent with the invention may populate data fields of an electronic document when using embedded applications. For purposes of explanation only, certain aspects and embodiments are described herein with reference to the components illustrated in FIGS. 1-5. The functionality of the illustrated components may overlap, however, and may be present in a fewer or greater number of elements and components. Further, all or part of the functionality of the illustrated elements may co-exist or be distributed among several geographically dispersed locations. Moreover, embodiments, features, aspects and principles of the present invention may be implemented in various environments and are not limited to the illustrated environments.

Further, the sequences of events described in FIGS. 1-5 are exemplary and not intended to be limiting. Thus, other process stages may be used, and even with the processes depicted in FIGS. 1-5, the particular order of events may vary without departing from the scope of the present invention. Moreover, certain process stages may not be present and additional stages may be implemented in FIGS. 1-5. Also, the processes described herein are not inherently related to any particular system or apparatus and may be implemented by any suitable combination of components.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for merging data into documents comprising:
   generating, by a backend computer, a first graphic user interface for a first user of the backend computer to access a frontend application on a frontend computer, the frontend application having a second graphic user interface visible to a second user through the frontend computer;
   setting, by a first application running on the backend computer, the second graphic user interface to be invisible to the second user while the frontend application is running on the frontend computer;
   controlling, by a backend application running on the backend computer, a data merge process of the frontend application to create multiple new documents within the frontend application by populating fields of a document template with merging data, while the second graphic user interface of the frontend application remains invisible to the second user to prevent the new documents from being visible to the second user during the data merge process;
   generating a first list identifying all opened documents on the frontend computer before the data merge process and a second list identifying all opened documents on the frontend computer after the data merge process;
   identifying the new documents by comparing the first list and the second list; and
   storing the identified documents.

2. The method of claim 1, further comprising retrieving the merging data from a database.

3. The method of claim 2, comprising retrieving the merging data by at least one of the backend computer and the frontend computer.

4. The method of claim 2, further comprising retrieving the merging data from a computing device separate from the frontend and the backend computers.

5. The method of claim 1, further comprising controlling, by the second application using ActiveX, the data merge process.

6. The method of claim 1, wherein storing the identified documents comprises triggering from the frontend computer saving of the newly created documents.

7. A system for merging data comprising:
   a frontend computer; and
   a backend computer:
      generating a first graphic user interface for a first user to access a frontend application on the frontend computer, the front end application having a second graphic user interface visible to a second user through the frontend computer;
      executing a first application to issue control commands to set the second graphic user interface of the frontend application to be invisible to the second user while the frontend application is running on the frontend computer; and
      executing a second application to control a data merge process within the frontend application while the second graphic user interface remains invisible to the second user;
   the frontend computer:
      executing the frontend application to generate the second graphic user interface;
      performing the data merge process using the frontend application to create multiple new documents by populating fields of a document template with merging data;
      making the second graphic user interface of the frontend application invisible to the second user in response to the control commands, during the data merge process to prevent the new documents from being visible to the second user;
      generating a first list identifying all opened documents on the frontend computer before the data merge process and a second list identifying all opened documents on the frontend computer after the data merge process; and
      identifying the new documents by comparing the first list and the second list; and
   a database for storing the identified documents.

8. The system of claim 7, wherein at least one of the backend computer and the frontend computer retrieves the merging data from a database.

9. The system of claim 8, wherein at least one of the backend computer and the frontend computer retrieves the merging data from a computing device separate from the frontend computer and the backend computer.

10. The system of claim 7, wherein the second application controls the data merge process using ActiveX.

11. The system of claim 7, wherein the backend computer issues commands to the frontend computer to maintain the second graphic user interface invisible to the second user during the data merge process.

12. The system of claim 7, wherein the frontend computer further triggers saving of the new documents.

13. A non-transitory computer-readable medium storing a computer program for merging data into documents, the program comprising:

computer code for generating a first graphic user interface for a first user of a backend computer to access a frontend application on a frontend computer, the frontend application having a second graphic user interface visible to a second user through the frontend computer;

computer code for executing a first application running on the backend computer to set the second graphic user interface to be invisible to the second user while the frontend application is running on the frontend computer;

computer code for controlling from the backend computer a data merge process of the frontend application to create multiple new documents within the frontend application by populating fields of a document template with merging data, while the second graphic user interface of the frontend application remains invisible to the second user to prevent the new documents from being visible to the second user during the data merge process;

computer code for generating a first list identifying all opened documents on the frontend computer before the data merge process and a second list identifying all opened documents on the frontend computer after the data merge process;

computer code for identifying the new documents by comparing the first list and the second list; and computer code for storing the identified documents in a database.

* * * * *